(No Model.)

B. BANNISTER.
TRUSS PAD.

No. 354,035. Patented Dec. 7, 1886.

Witnesses.
John B. Perkins
Eugene Horton

Inventor.
Burr Bannister
Per Wm. G. Button
Attorney.

UNITED STATES PATENT OFFICE.

BURR BANNISTER, OF KALAMAZOO, MICHIGAN.

TRUSS-PAD.

SPECIFICATION forming part of Letters Patent No. 354,035, dated December 7, 1886.

Application filed January 15, 1885. Renewed November 18, 1886. Serial No. 219,220. (No model.)

*To all whom it may concern:*

Be it known that I, BURR BANNISTER, a citizen of the United States, residing at Kalamazoo, in the county of Kalamazoo and State of Michigan, have invented certain new and useful Improvements in Truss-Pads; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
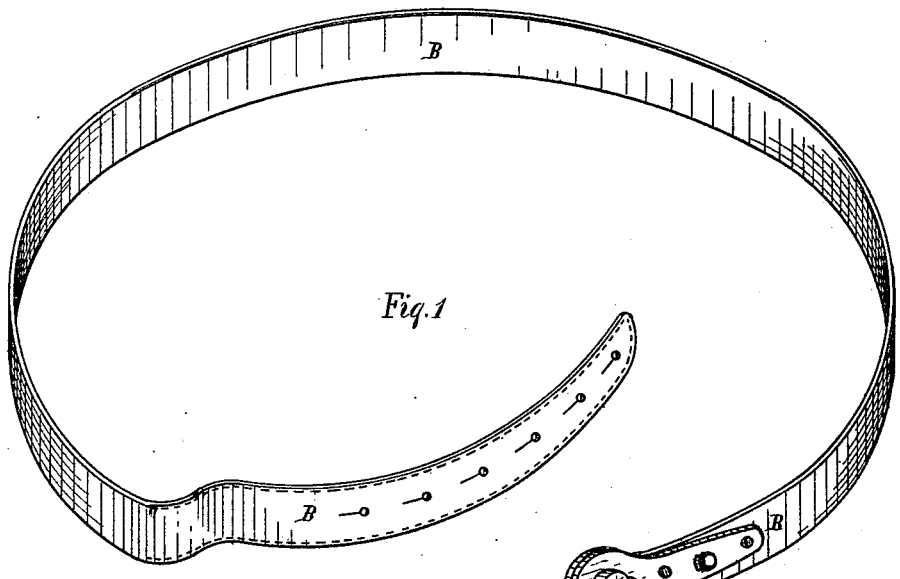
Figure 2:
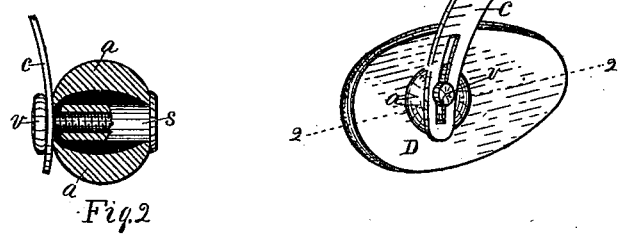
Figure 3:
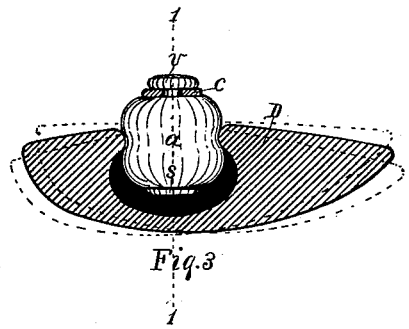

Figure 1 is a perspective view of truss. Fig. 2 represents a sectional view of elastic ball, taken on dotted line 1 1, Fig. 3, under compression. Fig. 3 is a sectional view of pad, taken on dotted line 2 2, Fig. 1.

B is the truss-band; C, an arm to which pad D is shown attached, but which may, if desired, under certain circumstances be omitted.

D is the pad, having a recess in which a rubber ball, $a$, may be inserted; $v$, a milled-head screw; $s$, a sleeve, forming with $v$ an adjusting-screw.

My invention relates to improvements in truss-pads for the retention of hernia. In making a flexible or elastic pad having its support on a ball of india-rubber, and by adjustment of the pad to the ball, any angle desired is obtained. The elastic pressure produced in pads constructed in this manner will conform or adapt itself to such tissue as required to hold in place.

The rubber ball $a$, Figs. 2 and 3, has a hole centrally through it for the adjustment of compressing-screw $v$ and $s$, which is made in separate pieces. $v$ is a screw with threads on its outer diameter, with a milled head, as shown at $v$, for manipulating the screw. $s$ is a sleeve provided with an internal thread. The outer surface is made smooth for rubber ball $a$ to move freely on in working the screw. The sleeve part of screw is provided with a flange, as shown at $s$, Fig. 2, to hold ball $a$. The compressing-screw $v$ and $s$ is shortened from its extreme length in working screw $v$ to expand ball $a$, and lengthened within the pad D when ball $a$ is diminished. The flange-sleeve $s$ should have no bearing on the inside of pad D.

The pad D, Fig. 3, has a round hole formed in it for adjusting ball $a$. The inner diameter of hole in bottom of pad D, Fig. 3, is made greater to give room for sleeve part of screws to move free or have no bearing on the inside of pad in adjusting the pad to different angles.

By giving greater or less surface in pad D at part having a bearing on ball $a$ when adjusted to pad, together with the density given the rubber ball $a$ by the compressing-screw $v$ and $s$, any degree of elasticity in the pad is obtained. In manipulating screw $v$ to fasten ball $a$ in pad D the ball $a$ is compressed in direction of its axis, producing an expansion laterally, thereby securing pad D to the ball.

I am aware of improvements having been patented in truss-pads whereby the pad is given different angles by means of ball-and-socket joint. I hereby disclaim all such improvements where the pad is held rigidly.

Having thus described my invention, what I claim as new, and desire to secure by Letters Patent, is—

In combination with the band and the pad of a truss, an expansible ball resting in a recess in the pad and connected to the band by an adjustable screw, all as set forth.

BURR BANNISTER.

Witnesses:
JOHN C. PERKIN,
HALE P. KAUFFER.